Patented Sept. 8, 1953

2,651,642

UNITED STATES PATENT OFFICE 2,651,642

PREPARATION OF DEHYDROCHOLIC ACID

Robert H. Sifferd, Joliet, Ill., assignor, by mesne assignments, to Armour and Company, Chicago, Ill., a corporation of Illinois No Drawing. Application June 19, 1951, Serial No. 232,451

6 Claims. (Cl. 260—397.1)

This invention relates to the preparation of dehydrocholic acid.

In the preparation of dehydrocholic acid it has been customary to dissolve or suspend cholic acid in a solvent chosen from the class of organic acids, ketones or hydrocarbons, and to oxidize the hydroxy groups of the cholic acid by the addition of chromic acid or by the generation of chromic acid in the reaction mixture.

After the oxidation has been performed, it has been necessary to separate dehydrocholic acid from accompanying impurities, side reaction products and the like by recrystallization from a suitable organic solvent. This additional treatment for the necessary purification of dehydrocholic acid invariably results in a loss of material and is a relatively expensive operation.

An object of the present invention is to provide a process for treating bile acids for the recovery of dehydrocholic acid while eliminating the purification step heretofore found necessary. A further object is to provide a process in which cholic acid is oxidized in a solvent for cholic acid, which solvent is a non-solvent for dehydrocholic acid, and separating the dehydrocholic acid. Yet another object is to provide a process of the character described in which not only is the purification step heretofore found necessary eliminated but also in which easy recovery of the solvent used in the oxidation mixture is brought about. Other specific objects and advantages will appear as the specification proceeds.

I have discovered that the purification step heretofore believed necessary may be eliminated by conducting the oxidation of cholic acid in an aqueous mixture containing a solvent for cholic acid which simultaneously is non-solvent for dehydrocholic acid to effect crystallization of the dehydrocholic acid and then separating the dehydrocholic acid by centrifuging, filtration, or any other suitable means.

As a specific example of the process, the cholic acid is oxidized in an aqueous mixture containing a tertiary alcohol and sulphuric acid by adding an aqueous solution of sodium bichromate to form chromic acid in the reaction mixture. The oxidation may be accomplished by directly adding chromic acid or by generating chromic acid in the reaction mixture by adding the sodium bichromate as above described. It will be understood that any other suitable oxidizing agent may be added.

The chromic acid oxidizes the hydroxy groups of the cholic acid to form dehydrocholic acid, which crystallizes out of the reaction mixture in a very pure form. The aqueous tertiary alcohol holds in solution any unreacted cholic acid and any partially oxidized reaction products or products of side reactions. It is necessary only to filter off the crystalline dehydrocholic acid, wash it briefly with tertiary alcohol, and then very thoroughly with water, in order to obtain a completely satisfactory dehydrocholic acid for medicinal use.

In addition to eliminating a previously necessary purification step, my method offers the further advantage of permitting easy recovery of the solvent used in the oxidation mixture. In those methods employing an organic acid or a ketone as the solvent component of the oxidation mixture, it has been found generally impractical to recover the organic solvent after isolation of the crude dehydrocholic acid formed in the reaction, since the mother liquor is a single liquid phase containing organic solvent, water, excess sulphuric acid, chromic salts, and other inorganic sulfates.

In my method, however, though the liquid components of the system start out in the reaction as a single liquid phase, the formation of chromic and sulfate salts during the reaction causes the tertiary alcohol to be thrown out of the aqueous phase, carrying with it the organic oxidation products. Upon completion of the oxidation and after permitting the two phases to separate, it is possible to draw off substantially all of the aqueous phase containing the excess sulphuric acid and other inorganic components of the reaction product, leaving all the desired organic oxidation product in the solvent phase. After removal of the suspended dehydrocholic acid by filtration, the solvent mother liquor is washed with an aqueous solution of sodium sulfate for removal of small amounts of residual sulphuric acid and chromic salts and the solvent then recovered by distillation from any suitable batch still.

In the foregoing process, a well-known equivalent of sulphuric acid, chromic acid, and the other specifically-named reaction materials, may be employed.

Additional specific examples of the process may be set out as follows:

*Example I*

300 lb. cholic acid is dissolved at room temperature in 300 gal. tertiary butyl alcohol. To this solution is added 125 gal. water, and with cooling to maintain a temperature of not more than 35° C. is added 37 gal. 66° Bé. sulphuric acid. To this mixture, under continuous agitation, is added an aqueous solution of 230 lb. commercial sodium bichromate dissolved in 60 gal. water, cooling the mixture during the addition of the bichromate solution to maintain a temperature of 40° to 42° C. After the addition of the sodium bichromate the mixture is further cooled to room temperature. It is allowed to stand several hours to permit separation of liquid phases, the aqueous chromic sulfate phase drawn off and discarded, and the crystalline dehydrocholic acid which is suspended in the solvent phase is collected in the basket centrifuge. The centrifuge cake is washed with three portions of tertiary butyl alcohol and then with distilled or deionized water until the washings are sulfate-free. The washed cake, after suitable drying, has a melting point of 237° to 239° C. and yields 210 to 220 lb. of material meeting National Formulary specifications. The solvent mother liquor is washed completely free of chromic salts by agitation with several portions of saturated aqueous sodium sulfate solution and is distilled for recovery of the tertiary butyl alcohol.

*Example II*

50 lb. cholic acid is dissolved at 40° C. in 40 gal. tertiary amyl alcohol. To this solution is added 20 gal. water followed by 95 lb. concentrated sulphuric acid, maintaining a temperature not higher than 40° C. To this mixture is added 38 lb. sodium bichromate dissolved in 10 gal. water, stirring the mixture continuously and cooling to maintain a temperature in the range of 38° to 40° C. Further treatment of the reaction mixture is carried out as indicated in Example I.

While in the foregoing specification I have set out steps of the process in considerable detail, it will be understood that such details of procedure may be varied widely by those skilled in the art without departing from the spirit of my invention.

I claim:

1. In the preparation of dehydrocholic acid from cholic acid, the steps of dissolving cholic acid in acidified aqueous tertiary alcohol which is a solvent for cholic acid and a non-solvent for dehydrocholic acid, reacting chromic acid therewith to form as a reaction product dehydrocholic acid and to form a separate tertiary alcohol phase and an aqueous phase, separating the alcohol phase from the aqueous phase and recovering dehydrocholic acid from the alcohol phase.

2. In the preparation of dehydrocholic acid from cholic acid, the steps of dissolving cholic acid in an aqueous solution of acidified tertiary alcohol which is a solvent for cholic acid and a non-solvent for dehydrocholic acid, adding aqueous sodium bichromate thereto to form as a reaction product dehydrocholic acid and to form separate liquid phases consisting of an alcohol phase and an aqueous phase, cooling the alcohol phase to crystallize dehydrocholic acid, and separating the dehydrocholic acid.

3. In the preparation of dehydrocholic acid from cholic acid, the steps of dissolving cholic acid in a solution of tertiary alcohol and sulphuric acid, reacting chromic acid therewith to form dehydrocholic acid and to form separate liquid phases consisting of an aqueous phase and an alcohol phase, separating the alcohol phase from the aqueous phase, and recovering the dehydrocholic acid from the alcohol phase.

4. In the preparation of dehydrocholic acid from cholic acid, the steps of dissolving cholic acid in an aqueous solution of tertiary alcohol and sulphuric acid, adding aqueous sodium bichromate to the mixture to form dehydrocholic acid and separate liquid and alcohol phases, cooling the mixture to crystallize the dehydrocholic acid, and separating the crystallized dehydrocholic acid from the alcohol phase.

5. The process of claim 4, in which the alcohol is tertiary butyl alcohol.

6. The process of claim 4, in which the alcohol is tertiary amyl alcohol.

ROBERT H. SIFFERD.

References Cited in the file of this patent

UNITED STATES PATENTS

| Number | Name | Date |
|---|---|---|
| 1,933,003 | Boedecker | Oct. 31, 1933 |
| 2,411,169 | Sifferd | Nov. 19, 1946 |
| 2,521,755 | Sifferd | Sept. 12, 1950 |